Oct. 20, 1925.

M. SWORASKI 1,557,896

AUTOMOBILE LOCK

Filed July 8, 1924  2 Sheets-Sheet 1

WITNESS:

INVENTOR

Michael Sworaski
BY
Augustus B. Stoughton
ATTORNEY.

Oct. 20, 1925.

M. SWORASKI

AUTOMOBILE LOCK

Filed July 8, 1924    2 Sheets-Sheet 2

1,557,896

WITNESS:
Rob R Kitchel

INVENTOR
Michael Sworaski
BY
Augustus B. Stoughton
ATTORNEY.

Patented Oct. 20, 1925.

1,557,896

UNITED STATES PATENT OFFICE.

MICHAEL SWORASKI, OF PHILADELPHIA, PENNSYLVANIA.

AUTOMOBILE LOCK.

Application filed July 8, 1924. Serial No. 724,750.

*To all whom it may concern:*

Be it known that I, MICHAEL SWORASKI, a citizen of the United States, residing at Philadelphia, in the county of Philadelphia and State of Pennsylvania, have invented a new and useful Improvement in Automobile Locks, of which the following is a specification.

My invention relates to safety devices for automobiles of that type in which the various mechanical and electrical mechanisms of the car are locked to prevent unauthorized operation of the car.

The primary object of my invention is to provide a locking mechanism which may be mounted upon the steering post of an automobile and which will serve to simultaneously lock the steering gear, the spark and throttle operating mechanisms or other mechanical mechanisms and also the various electrical mechanisms with which the car is equipped. Another object of my invention is to provide a supplementary emergency mechanism which is only operable when the others are locked in order that when the car is standing and the various primary electrical mechanisms are locked it will still be possible to have a light upon the car. A still further object is to provide a secondary locking device for the principal lock so that such principal lock can be neither locked nor unlocked without operation of the secondary locking device.

These objects I accomplish in the manner hereinafter set forth, reference being had to the accompanying drawings, in which Fig. 1 is a side view of locking mechanism constructed in accordance with my invention and illustrated as applied to the steering post of an automobile.

Figure 1:
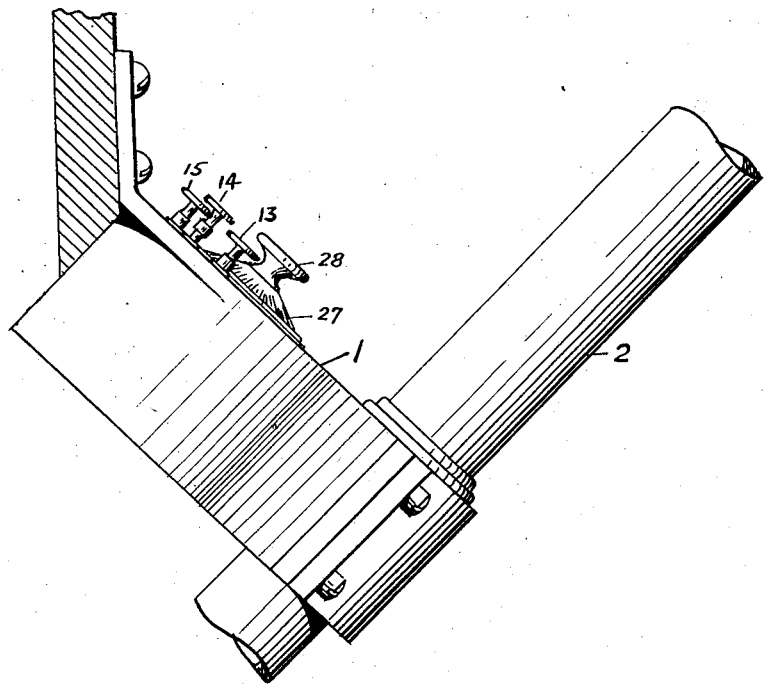
Figure 2:
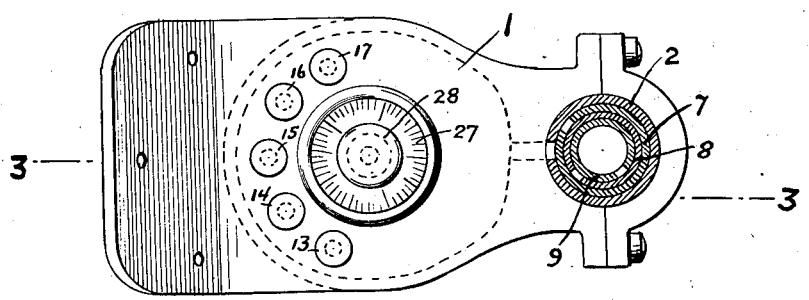
Fig. 2 is a top or plan view of the locking mechanism, the steering post being shown in section.
Figure 4:
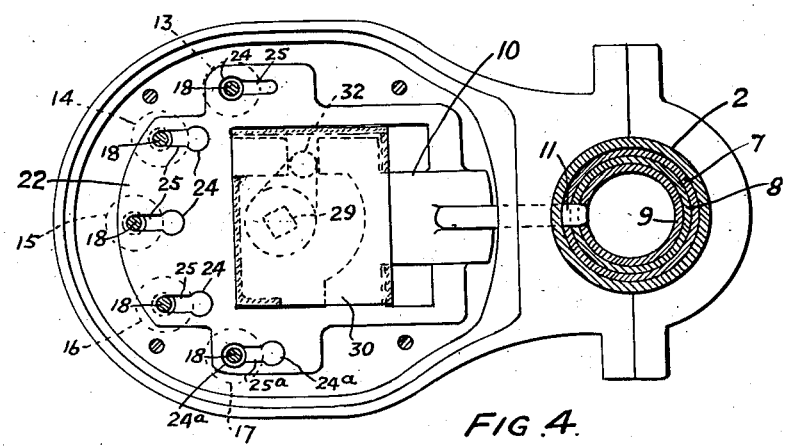
Fig. 4 is a sectional view on the line 4—4, Fig. 3, looking upwards.

The various elements of the locking mechanism are mounted upon a plate 1 which is secured to the steering post 2 of the automobile and which constitute the top part of a housing. Within this post 2 are adapted to rotate sleeves 7, 8 and 9 which may control, respectively, the steering mechanism, the spark and the throttle, in the usual manner. When the car is in operation these various sleeves are permitted to rotate freely within the post 2, as shown in Fig. 2, but when it is desired to lock the operation thereof they are adjusted to the position shown in Fig. 4, wherein the slots or openings in the respective sleeves are brought into alignment with an opening or slot in the post 2. When in this position the lock mechanism is operated and the bolt 10 thereof is projected and a pin 11 mounted thereon is caused to enter and pass through the various slots and thereby lock the sleeves against rotation.

The various electrical features of the car are controlled by a set of buttons 14, 15 and 16, which are positioned in a circular row at the upper face of the plate 1.

Secured to each of the buttons is a rod 18 which passes through the plate 1 and into a circuit closing box mounted upon the rear plate 20 of the lock structure. The rear end of each rod 18 is provided with a head 21 adapted to either complete or break a circuit between positive and negative terminals mounted within the circuit closing box 19.

When a button is in its normal or depressed position the circuit is broken, but when a button is pulled upwardly the head 21 of the rod 18 contacts with the positive and negative terminals in the corresponding circuit closing box, thereby establishing the corresponding circuit.

Figure 3:
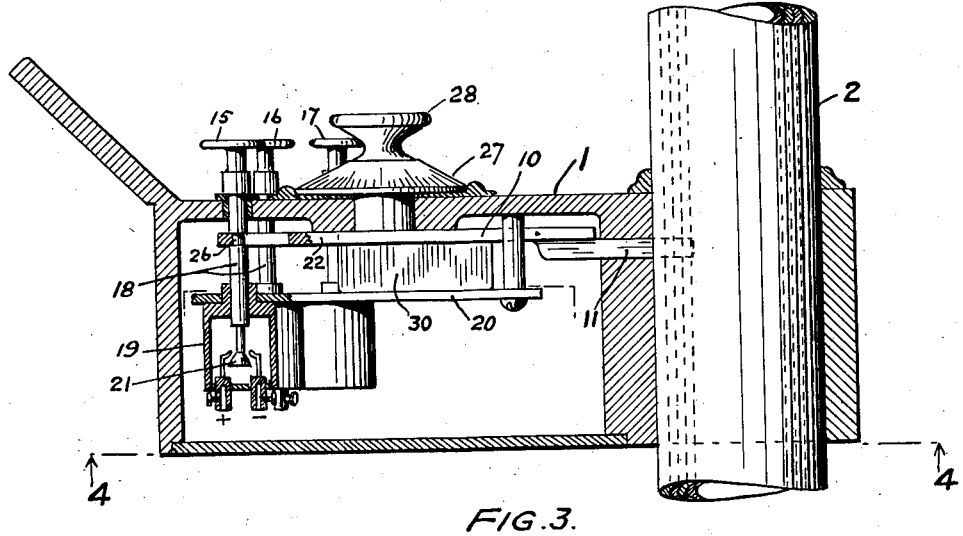
Fig. 3 is a sectional view on the line 3—3 of Fig. 2.

The primary object of my invention is to provide means which will permit free operation of the buttons 14, 15 and 16 and their attendant mechanism when the locking bolt 10 is retracted, but which will prevent operation of said buttons and mechanism when the locking bolt is projected. To accomplish this I mount upon the bolt 10 a plate 22 adapted to operate between the rear wall 20 of the housing and the front wall thereof. This plate is provided with a series of circular apertures 24 through which the rods 18 secured to the buttons 14, 15 and 16 may freely pass. Each aperture 24, however, is in communication with a narrow slot 25 of such width that it will engage with a narrow portion or neck 26 of the corresponding rod 18. When all of the buttons are depressed these narrow portions 26 are in line with the plate 22 and when the same travels with the bolt 10 of the lock to the position shown in Figs. 3 and 4, the narrow portions 26 are engaged by the slots 25 and operation of the buttons with consequent longitudinal movement of the rods 18 is prevented. This takes place with the heads 21 out of contact with the positive and negative terminals in the circuit closing box, consequently none of the circuits may be established.

The operation of the button 13 and co-acting mechanism is the reverse of that previously described in connection with the other buttons. The purpose of this button is to establish a circuit which will create a light at such times as the automobile is standing still and it is desired to lock the other mechanisms, therefore the positions of the aperture 24 and slot 25 coacting with the rod 18 of the button 13 are reversed so that when the plate 22 is in one position the slot 25 engages with the narrow portion 26 of the rod 18 of the button 13 and prevents operation thereof but when the plate is adjusted to the position shown in Figs. 3 and 4, and the other elements are locked, the rod 18 of the button 13 may move freely through its aperture 24.

Any type of suitable lock may be employed in connection with my invention, and inasmuch as the nature of the lock itself is immaterial I make no effort to illustrate any lock in detail, satisfying myself with the mere indication of the presence of a combination lock of which I show the dial 27, knob 28, stem 29, side casing 30, and projecting arm carrying a pin 32 which engages with a slot in the bolt 10 and serves to operate the latter.

It is, of course, obvious that a key lock could be as readily employed.

Figures 5, 6:
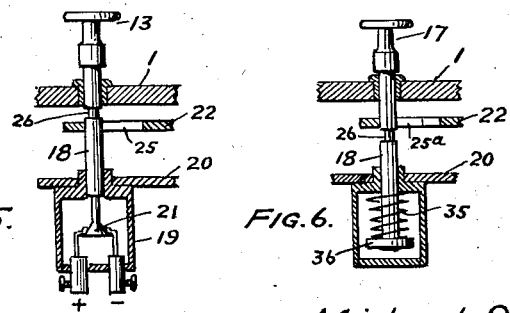
Figs. 5 and 6 are vertical sectional views showing details of construction.

If desired a supplementary button 17 may be added to the series of buttons, this button being in the nature of a secondary lock. To outward appearances it is the same as any of the circuit controlling buttons but its inner construction is as best shown in Fig. 6, wherein it will be observed that no circuit is established or broken by the operation of this button. It is normally retained in depressed position by means of a coiled spring 35 interposed between a head 36 on the rear end of the rod 18 and the rear wall 20 of the lock structure. The rod 18 is adapted to pass through either of apertures 24ª in the plate 22, and these apertures are connected by means of a slot 25ª. When the button 17 is in its normal depressed position it is impossible to throw the locking bolt 10 in either direction and in order that the lock may be operated to either lock or unlock it is necessary that the button 17 be pulled upwardly, bringing the narrow portion 26 of its rod 18 into alignment with the plate 22 and holding it in such position during the operation of the lock. It is then released and automatically restored to normal position by the action of the coiled spring 35, and consequently serves not only as a secondary lock but also prevents any accidental movement of the bolt 10 of the principal lock and of the plate 22.

It will be obvious to those skilled in the art to which the invention relates that modifications may be made in details of construction and arrangement without departing from the spirit of the invention which is not limited to such matters or otherwise than the prior art and the appended claims may require.

I claim:

1. Means for use with the movable controlling member of an automobile and with a lock the bolt of which may engage said controlling member and prevent movement thereof, comprising in combination, a plurality of electric circuit closing members, each embodying a longitudinally movable rod having a section of restricted diameter, and means secured to the bolt of said lock and movable therewith and adapted to engage said rods and prevent longitudinal movement thereof and to free the rods, said means comprising a plate apertured for the passage therethrough of said rods and for locking the plate and having slots of restricted width communicating with the apertures and adapted to embrace the portions of the rods of restricted diameter to permit of movement of the plate but not of the rods, said portions being so positioned in respect to the length of the rods that when engaged by the slots in said plate the electric circuits adapted to be closed by movement of the rods are open.

2. The combination, for use in an automobile lock, of a plurality of movable electric circuit closing and opening push button members and locking means movable to engage the same and prevent and permit relative movement thereof, one of said members being locked by said means when it is at one extreme of its movement and the others of said members being locked by said means when it is at the other extreme of its movement whereby one of the electric circuit closing members cannot be moved to close its circuit while the rest of said members can be so moved but can be moved to close its circuit while the rest of said members are locked in open position.

MICHAEL SWORASKI.